United States Patent [19]
Wissgott

[11] Patent Number: 5,888,574
[45] Date of Patent: Mar. 30, 1999

[54] PROCESS TO IMPROVE COLOR STABILITY OF FRUITS AND VEGETABLES CONTAINING CAROTENOIDS

[75] Inventor: Ulrich Wissgott, La Tour-de-Peilz, Switzerland

[73] Assignee: Nestec SA.,, Vevey, Switzerland

[21] Appl. No.: 811,905

[22] Filed: Mar. 5, 1997

[30] Foreign Application Priority Data

Mar. 7, 1996 [EP] European Pat. Off. ............ 96200624.3

[51] Int. Cl.$^6$ .............................. A23B 7/06; A23L 1/272
[52] U.S. Cl. ...................... 426/542; 426/262; 426/270; 426/506; 426/508; 426/542; 426/654
[58] Field of Search ..................... 426/542, 654, 426/506, 508, 262, 270

[56] References Cited

U.S. PATENT DOCUMENTS

| | | | |
|---|---|---|---|
| 2,709,657 | 5/1955 | Campbell et al. ................... | 426/542 |
| 3,497,362 | 2/1970 | Patron et al. ........................ | 426/542 |
| 3,732,111 | 5/1973 | Berner et al. ....................... | 426/542 |
| 3,894,157 | 7/1975 | Gottlieb et al. . | |
| 4,008,336 | 2/1977 | Haendler et al. . | |
| 4,891,231 | 1/1990 | Mai et al. ............................ | 426/542 |
| 5,068,115 | 11/1991 | Liebermann ......................... | 426/542 |
| 5,079,016 | 1/1992 | Tood, Jr. . | |
| 5,338,558 | 8/1994 | Aung et al. . | |
| 5,492,709 | 2/1996 | Aeschbach et al. . | |

FOREIGN PATENT DOCUMENTS

| | | |
|---|---|---|
| 983076 | 7/1951 | France . |
| 2050968 | 2/1971 | France . |
| 62126953 | 3/1987 | Japan . |
| 1417358 | 12/1975 | United Kingdom . |
| 94/22322 | 10/1994 | WIPO . |

OTHER PUBLICATIONS

Derwent Information, Ltd., Database Abstract WPI Accession No. 94–014393/02, abstract of Kadyshev et al., Soviet Union Patent Document No. SU 1782157 (1994).

Derwent Information Ltd., Database Abstract WPI Accession No. 88–336329/47. abstract of Tamkovich et al., Soviet Union Patent Document No. SU 1395271 (1988).

Derwent Information Ltd., Database Abstract WPI Accession No. 87–196286, abstract of Hasegawa Ltd., Japanese Patent Document No. JP–A–62–126953 (1987).

Derwent Information Ltd., Database Abstract WPI Accession No. 71–441T05126, Abstract of Zongaro, French Patent Application from Publication No. 2.050.968, Jul. 1951.

*Primary Examiner*—Helen Pratt
*Attorney, Agent, or Firm*—Vogt & O'Donnell, LLP

[57] ABSTRACT

The color of vegetables and fruits which contain carotenoids is stabilized by adding to water particles of tea, by-products of tea extraction, a spice, rice bran, tomato skins, tomato seeds and/or paprika seeds so that the particulate material is contained in the water in an amount of at least 0.5 g per liter water, and vegetables or fruits which contain carotenoids are blanched in the particulate-containing water having a temperature between 70° C. and 100° C. for a time for stabilizing their color, and after which, blanch water is separated from the treated vegetables and/or fruits. Further, the particulate-containing water and the fruits or vegetables may be placed in and blanched in a pouch, particularly a water-permeable pouch so that blanch water may be separated from the pouch and so that particulate material is retained in the pouch.

14 Claims, No Drawings

PROCESS TO IMPROVE COLOR STABILITY OF FRUITS AND VEGETABLES CONTAINING CAROTENOIDS

BACKGROUND OF THE INVENTION

The invention relates to a process for the preparation of fruits and vegetables containing carotenoids.

Carotenoids are a class of pigments whose colour varies between yellow, red and orange, according to the fruit or vegetable considered and the concentration in the said fruit or vegetable. They comprise lycopene, carotenes and xanthophyll. These carotenoids are present naturally in certain food compounds, such as carrots, tomatoes and various other yellow and orange-coloured fruits. It is known that they can be degraded over time under the effect of light and oxygen as well as following treatments at high temperature.

Various methods for preserving products based on fruits and vegetables manufactured industrially have been commonly used for a long time, but use of chemical preservatives, which are poorly accepted by consumers at the present time. It also is already known to protect carotenoid-type colourings with a tea extract. Japanese Patent Document No. JP- A 62-126953 in the name of Hasegawa KK relates to a protection of carotenoids by a tea extract and a mixture of this extract with the pigments to be protected. This method is intended for the stabilization of carotenoid colourings and exhibits various disadvantages for application to food products, the first being that if an extraction of tea is carried out, only certain protective and stabilizing compounds are removed from it and a considerable part of the active ingredients are still lost during processing into a marketable product. It may therefore happen that some compounds which may be beneficial for the protection of the said carotenoids are not present. Moreover, the extraction of the tea, its mixing with the carotenoids extracted, the concentration and the drying are additional stages which increase the cost of the finished product. Finally, when the extract is mixed with the product to be protected, there will be an immediate consumption of the protective compound, such that there will be no protection over a long period.

SUMMARY OF THE INVENTION

The aim of the present invention is to develop a process for the protection of fruits and vegetables containing carotenoids, in which a good availability of the protective compounds is ensured, the protection of the colour is ensured over a long duration of storage, only natural food products are used as a source of protective compounds and the protective compounds are brought into contact with the products to be protected in an operation integrated into the manufacturing and storage processes.

The invention provides a process for the preparation of fruits and vegetables containing carotenoides, in order to obtain better stability of the colour, in which the said fruit or the said vegetable is brought into contact, in an aqueous phase, with a protective product chosen from the group consisting of tea, by-products of the extraction of tea, a spice, rice bran, tomato skins and seeds, paprika seeds and mixtures thereof.

The benefit of the process according to the invention is that the operation is carried out directly in an aqueous phase between the product to be protected and the protective compound. There is no extraction stage followed by additional operations, such as concentration and drying. Moreover, natural products and products acceptable in the food domain are used. The aim is to achieve long-term protection with a gradual release of the constituents responsible for the protection.

DETAILED DESCRIPTION OF THE INVENTION

There are according to the invention two possibilities for achieving the desired result. Either the operation is carried out by the blanching route, or the protective product is mixed with the product to be protected and the said mixture is stored.

In the case where the process is carried out by blanching, the fruit or vegetable is brought into contact with an aqueous phase containing the protective product at a temperature of between 70° and 100° C., the protective component being present at a content of between 0.5 and 2 g/litre of water, and the aqueous phase is separated from the said fruit or vegetable. The duration of blanching is not critical and depends on the nature of the protective component, the action being allowed to take place for a period sufficient for the protective compound to react in favour of the protection of the pigments.

As regards the blanching, it is possible to follow two different routes wherein water containing the protective product is brought into contact with the fruit at a temperature of between 70° and 100° C. Either the productive product is placed directly in the aqueous phase and the water containing the said protective product is separated at the end of the blanching, or the protective component is placed in a permeable pouch and the blanching is carried out with the water containing the pouch and the fruit or vegetable to be protected. The advantage of the second solution is that it simplifies the stage for separation of the water and of the protective product. Pouch is understood to mean any container which makes it possible to keep the protective product without it being able to escape therefrom, the pouch being of course permeable to water.

In a preferred embodiment, the blanching is carried out in water at a temperature of the order of 92° C. for a period of between 8 and 10 minutes. The aqueous phase is then separated from the treated vege- tables or fruits and they are dried at a temperature of between 70° C. and 100° C. until the desired consistency and dehydration are obtained. A product is thus available for which degradation of the carotenoids is minimized, as will be specified below with reference to the examples.

The protective capacity depends on the nature of the protective product and on its content of protective ingredient. As a general rule, with a protective product content of less than 0.5 g/litre of water, the expected result is hardly obtained, whereas a content greater than 2 g/litre of water does not offer any improvement in the stabilization of the colour. Thus, the amount of protective product employed is at least 0.5 g/litre of water.

In the case of the second type of implementation of the process, the fruit or vegetable is mixed with the protective product placed in a separate pouch or finely ground and the mixture thus obtained is stored. In this latter embodiment, the protective product will be consumed with the protective fruit or vegetable and it is therefore necessary for the protective product to be ground in accordance with the organoleptic characteristics of the final product. In general, the addition of the protective product does not modify the appearance and the taste of the protected product, unless if a spice is added at a high concentration. In some cases, it can even be said that the presence of spices is desired, for example for tomato purée which can be used as pizza topping. In the case of the protective product in a separate pouch, the protective compound is allowed to diffuse during the entire duration of storage and the said pouch is separated before consumption.

The fruit or vegetable treated according to the invention is either in the cut form, or in the purée form. Numerous fruits and vegetables exist which contain carotenoids. According to the invention, the treatment of products based on tomato, carrot, yellow peach, apricot and orange is envisaged more particularly. As products based on tomato, it is also possible to envisage the treatment of tomato purée intended for the manufacture of sauces for frozen pizzas, the manufacture of ketchup, the sterilization or the manufacture of powders. Carrots is intended to mean both cut carrots and carrot purée for jars of baby food. Peaches and apricots are intended to be cut into pieces and put in a syrup.

As regards the protective products, it has been observed that the best results are obtained for tea with green tea. Green tea exists in the form of cut L leaves. By-products of the extraction of tea is understood to mean the spent tea leaves after extraction. Rice bran and tomato skins and seeds are by-products of industrial manufacture which nave the advantage of being therefore inexpensive and of having a neutral taste. The spice is chosen from thyme, sage, rosemary, oregano and marjoram.

If the procedure is carried out based on the second embodiment according to the invention, the protective product is used at a concentration which makes it possible to obtain a good result. For green tea, between 1 and 3 g of it is used per kg of treated fruit or vegetable. For rice bran, 10 to 40 g of it are used per kg of treated fruit or vegetable. For tomato skins and seeds, they are mixed in an amount of 40 to 60 g per kg of treated fruit or vegetable and for spices, in an amount of 0.1 to 0.3 g per kg of treated vegetable or fruit.

In the case of carrots, they are treated in the cut form preferably by blanching. In this case, they are immersed in water containing cut green tea leaves at a concentration of 1 g of green tea per litre of water or of rice bran at a concentration of 10 g/l. The blanching is carried out at 90°–95° C. for 8 to 10 minutes, the aqueous phase is separated and the cut carrots, which find a use in dehydrated soups and the like, are finally dried.

In the case of tomato purée the procedure is carried out rather according to the second mode, namely mixing with ground tomato or paprika seeds or spices.

With fruits, such as yellow peaches, they are placed cut in a syrup and the protective product, such as green tea, is added thereto in a separate pouch. The diffusion thus occurs during the entire duration of storage of the protective compound. At the time of consumption, the pouch simply has to be separated and discarded.

It has finally been observed that it is possible to achieve synergy by mixing several of the protective components mentioned above and also by adding other known antioxidants such as ascorbic acid. The latter is then used in an amount of 0.1 to 0.4% relative to the fruit or vegetable aqueous phase. The above percentage is by weight.

To clearly demonstrate the reduction in the degradation of the carotenoids, it is necessary to first of all extract these pigments and then to make an optical measurement in order to determine their concentration. To extract the sample, out the sample is mixed with 20 ml of dichloromethane, homogenized, stirred, filtered and washed with a mixture of tetrahydrofuran and dichloromethane. Decantation is performed, and the top aqueous layer is separated and evaporated at 30° C.

The extract of carotenoid pigments is dissolved in tetrahydrofuran and a spectrophotometric measurement is carried out with a Hewlett Packard apparatus. The concentration, as regards tomato-based products, is determined from the absorption at 478 nm. The degradation of the pigments and of the colour can thus be objectively compared in the presence and in the absence of the protective products.

The remainder of the description is made in relation with examples.

EXAMPLE 1

The operation is carried out with water containing 1 g of green tea per litre. This water is heated to 92° C. and cut carrots are immersed therein and allowed to stand for 9 minutes. The water containing the tea is separated and the carrots are dried at 70° C. for 4 hours in order to obtain a moisture content of 30%.

If a comparison is made with carrots having undergone a normal blanching, after three months of storage at 37° C. (accelerated storage test), only 6% of the initial beta-carotene remains, whereas with the above-mentioned treatment, 40% of beta-carotene is preserved.

EXAMPLE 2

The operation is carried out with water containing 1 g of green tea per litre. This water is heated to 92° C. and cut carrots are immersed therein and allowed to stand for 9 minutes. The water containing the tea is separated and the carrots are dried at 100° C. in order to obtain a moisture content of about 5%.

If a comparison is made with carrots having undergone a normal blanching, a more intense orange colour is observed, indicating preservation of the pigments during the drying at high temperature.

EXAMPLE 3

The operation is carried out in water containing 10 g of rice bran per litre suspended in a bag made of filter tissue. This water is heated to 92° C. and cut carrots are immersed therein and allowed to stand for 9 minutes. The water and the bag containing the rice bran are separated and the carrots are dried at 70° C. for about 4 hours in order to obtain a moisture content of 30%.

The carrots treated with rice bran have a very bright orange colour, without browning. If a comparison is made with carrots having undergone normal blanching, after 40 days of storage at 37° C. (accelerated storage test), less than 20% of initial carotenoids remain whereas with the above-mentioned treatment, more than 60% of the pigments are preserved.

EXAMPLE 4

0.2% dried rosemary is mixed with tomato pulp and this sauce is applied over a pizza which is stored in a freezer at −25° C. for 10 weeks. It is observed, compared with a reference tomato sauce with no added spice, that only 50% of the pigments remain, whereas the treated pulp preserves its colour and 80% of the said pigments.

A similar result is obtained with 0.2% marjoram.

EXAMPLE 5

5% tomato seeds are mixed with tomato pulp and this sauce is applied over a pizza which is frozen at −25° C. It is observed that after a period of storage of 10 weeks, a gain in preservation of the pigments of more than 10% is obtained compared with an untreated sample.

I claim:

1. A process for stabilizing the color of vegetables and fruits which contain carotenoids comprising adding to water a particulate material selected from the group consisting of particles of tea, by-products of tea extraction, a spice, rice bran, tomato skins, tomato seeds and paprika seeds so that the particulate material is contained in the water in an amount of at least 0.5 g per liter water, blanching a substance selected from the group consisting of vegetables which contain carotenoids and fruits which contain carotenoids in the particulate-containing water having a temperature between 70° C. and 100° C. for a time for stabilizing the color of the substance to obtain a particulate-material treated substance contained in blanch water and separating the blanch water from the treated substance to obtain the treated substance.

2. A process according to claim 1 further comprising placing the particulate-containing water and the substance within a pouch and blanching the substance in the particulate-containing water in the pouch at the temperature between 70° C. and 100° C. for the time for stabilizing the color of the substance to obtain the treated substance in the blanch water and separating the blanch water from the treated substance to obtain the treated substance.

3. A process according to claim 2 wherein the pouch is permeable so that, for separating the blanch water from the treated substance, the blanch water permeates from within the pouch through the pouch and so that particulate material is retained within the pouch with the treated substance.

4. A process according to claim 1 or 2 or 3 wherein the substance is blanched for a time of between 8 minutes and 10 minutes.

5. A process according to claim 1 or 2 or 3 wherein the particulate material is green tea particles.

6. A process according to claim 5 wherein the green tea particles are in an amount of from 0.5 g to 2 g per liter water.

7. A process according to claim 1 or 2 or 3 wherein the particulate material is rice bran particles.

8. A process according to claim 1 or 2 or 3 wherein the particulate material is spice particles.

9. A process according to claim 8 wherein the spice particles are selected from the group consisting of thyme, sage, rosemary, oregano and marjoram particles.

10. A process according to claim 1 or 2 or 3, wherein the particulate material is selected from the group consisting of tomato skin and tomato seed particles.

11. A process according to claim 1 or 2 or 3 wherein the substance is selected from the group consisting of carrots, tomatoes, yellow peaches, apricots and oranges.

12. A process according to claim 1 or 2 or 3 wherein the substance is carrots and the particulate material is selected from the group consisting of green tea and rice bran particles.

13. A process according to claim 1 further comprising drying the treated substance obtained.

14. A process according to claim 1 further comprising adding ascorbic acid with the water and particulate material in an amount of from 0.1% to 0.4% by weight based on the substance weight.

* * * * *